G. W. WILKIN & J. P. KEE.
POWER TRANSMISSION MEANS.
APPLICATION FILED JAN. 19, 1918.
1,300,316.
Patented Apr. 15, 1919.
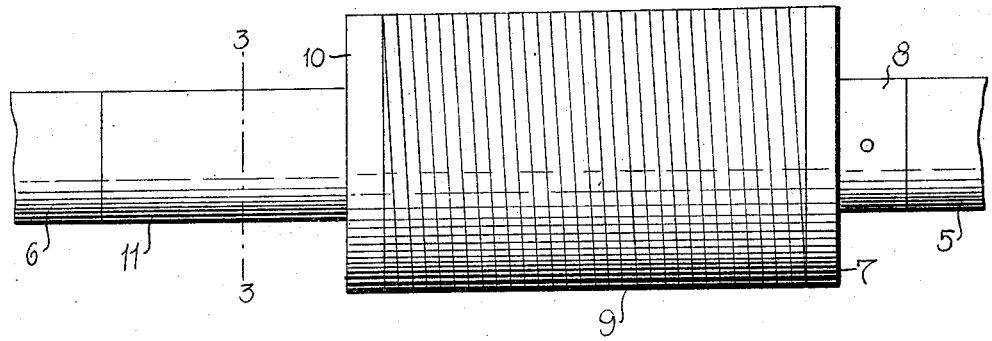
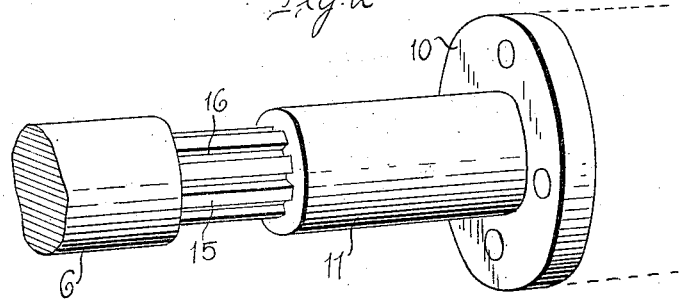
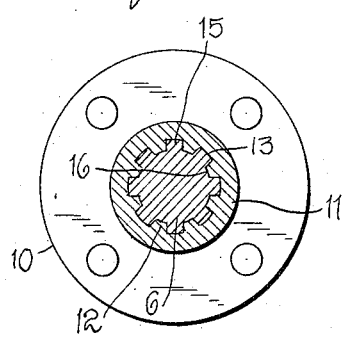
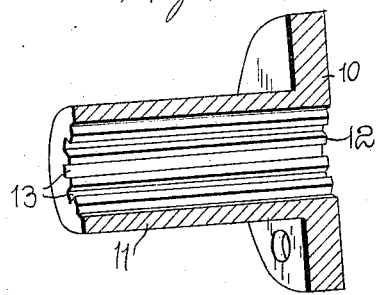
Inventors
GEORGE W. WILKIN
JOHN P. KEE
By Watson E. Coleman
Attorney

UNITED STATES PATENT OFFICE.

GEORGE W. WILKIN AND JOHN P. KEE, OF GRANGEVILLE, IDAHO.

POWER-TRANSMISSION MEANS.

1,300,316.  Specification of Letters Patent.  Patented Apr. 15, 1919.

Application filed January 19, 1918. Serial No. 212,652.

*To all whom it may concern:*

Be it known that we, GEORGE W. WILKIN and JOHN P. KEE, citizens of the United States, residing at Grangeville, in the county of Idaho and State of Idaho, have invented certain new and useful Improvements in Power-Transmission Means, of which the following is a specification, reference being had to the accompanying drawings.

This invention relates to an improved power transmission device and has for its primary object to provide a power transmission shaft for use in connection with driving machinery of all kinds which is so constructed that shock, jar or vibration will be completely absorbed and rearrangement of delicate parts of the machine obviated.

It is a more particular object of our invention to provide a power transmission shaft embodying two sections, and an elastically yieldable joint connecting said shaft sections and permitting of their relative angular movement.

It is also a further general object of our invention to provide a device for the above purpose which is of very simple construction, strong, durable, effective and reliable in practical use.

With the above and other objects in view the invention consists in the improved construction, combination and arrangement of the several parts as will be hereinafter more fully described subsequently claimed and illustrated in the accompanying drawing in which similar reference characters designate corresponding parts throughout the several parts and wherein:

Figure 1 is an elevation of our improved power transmission shaft;

Fig. 2 is a perspective view showing one of the joint members and the shaft section on which it is mounted;

Fig. 3 is a section taken on the line 3—3 of Fig. 1; and

Fig. 4 is a sectional perspective view of the coupling means between the elastic elements and one of the shaft sections.

Referring in detail to the drawing 5 and 6 respectively, designate the two sections of a power transmission shaft. The shaft section 5 is secured within a central boss 8 formed upon a metal plate 7. To the opposite side of this plate one end of a closely coiled flat metal spring 9 is riveted or otherwise securely fixed.

10 designates a plate or flange formed on one end of a metal sleeve 11. This plate is riveted to the opposite end of the spring 9, the sleeve 11 projecting longitudinally in axial alinement with said spring. The bore of this sleeve is formed with alternately arranged longitudinally extending ribs or keys 12 and grooves or channels 13.

The other shaft section 6 has one of its ends reduced as at 14 and this reduced end of the shaft is likewise provided with the alternately arranged ribs or keys 15 and the grooves or channels 16 for engagement with the ribs and channels respectively of the sleeve 11. Thus it will be manifest that the shaft section 6 and the sleeve 11 will be operatively connected for rotation as a unit while at the same time they have a relative axial movement.

In the operation and use of our improved power transmission shaft, it will be readily seen that the elastic element or spring 9 affords means for the transmission of rotation from one shaft section to the other without loss of power. Any shock or jar to which either shaft section may be subjected, will be completely absorbed by this spring and not transmitted to the other section of the shaft. This spring is capable of an elastic flexing movement, in all angular directions relative to the axis of rotation and constitutes a universally movable joint capable of the continuous transmission of power from one shaft section to the other in the operation of the device.

From the foregoing description taken in connection with the accompanying drawing, the construction, manner of operation and several advantages of the invention will be clearly and fully understood. The device may be advantageously employed upon many different kinds of machinery, and likewise in the driving mechanism of motor vehicles. The several parts of the device are of exceedingly simple form which will be effective and reliable in their operation and require but little care or attention. It will be apparent that the elastic spring connection between the shaft sections may be of any desired size in accordance with the shaft diameter, and the coupling sleeve 11 may be provided with a greater or less number of the ribs and channels as may be preferred. It is therefore to be understood that while we have herein shown and described, the preferred form and construction of the several parts, the device is nevertheless susceptible of many modifications therein and we therefore reserve the privilege of adopting all such legitimate changes as may be fairly embodied within the spirit and scope of the invention as claimed.

Having thus fully described our invention, what we claim and desire to secure by Letters Patent is:—

The combination with the shaft sections, of a flexible joint connecting said sections including joint members each consisting of a disk, one of said members being rigidly fixed to one shaft section, the other of said disks being provided with a sleeve extending from one side thereof having spaced longitudinally extending keys, the other of the shaft sections being provided with complementary grooves to receive said keys whereby the joint member is connected for rotation with the shaft section and for longitudinal movement with respect thereto, and a flat metal spring having its coils normally in contacting engagement with each other and the ends of said spring being fixed to the disks of the respective joint members, said spring being of the same external diameter as the diameter of said disks and strongly resistant to torsional stresses but permitting of a yielding axial displacement of the shaft sections.

In testimony whereof we hereunto affix our signatures in the presence of two witnesses.

GEORGE W. WILKIN.
JOHN P. KEE.

Witnesses:
GRANT A. GREEN,
J. J. LAMM.

Copies of this patent may be obtained for five cents each, by addressing the "Commissioner of Patents Washington, D. C."